Dec. 14, 1937.     W. C. YEAKEL     2,102,248
CONVEYER
Filed Feb. 25, 1935     7 Sheets-Sheet 1

Inventor:
Walter C. Yeakel
By: Brown, Jackson, Boettcher & Dienner
Attys.

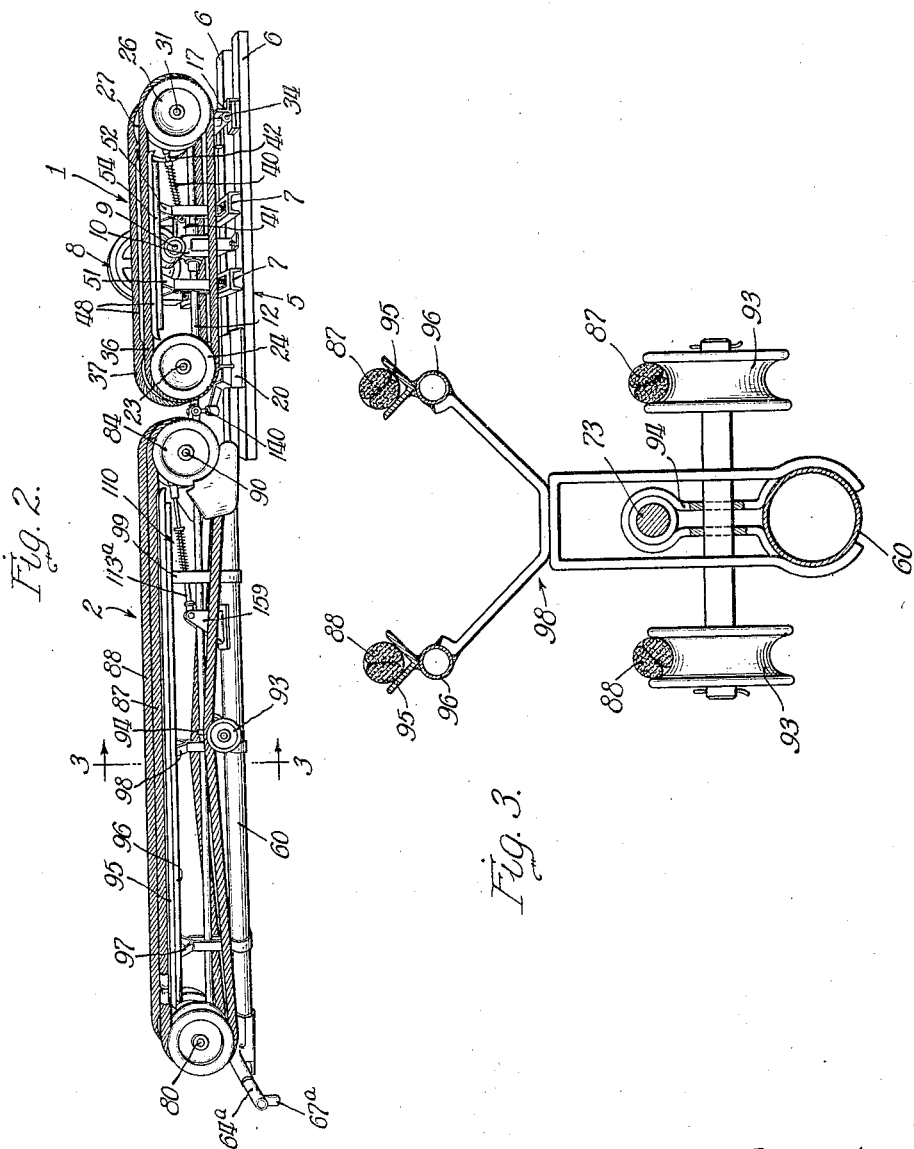

Dec. 14, 1937.   W. C. YEAKEL   2,102,248
CONVEYER
Filed Feb. 25, 1935   7 Sheets-Sheet 3

Inventor:
Walter C. Yeakel
By: Brown, Jackson, Boettcher & Dienner
Attys

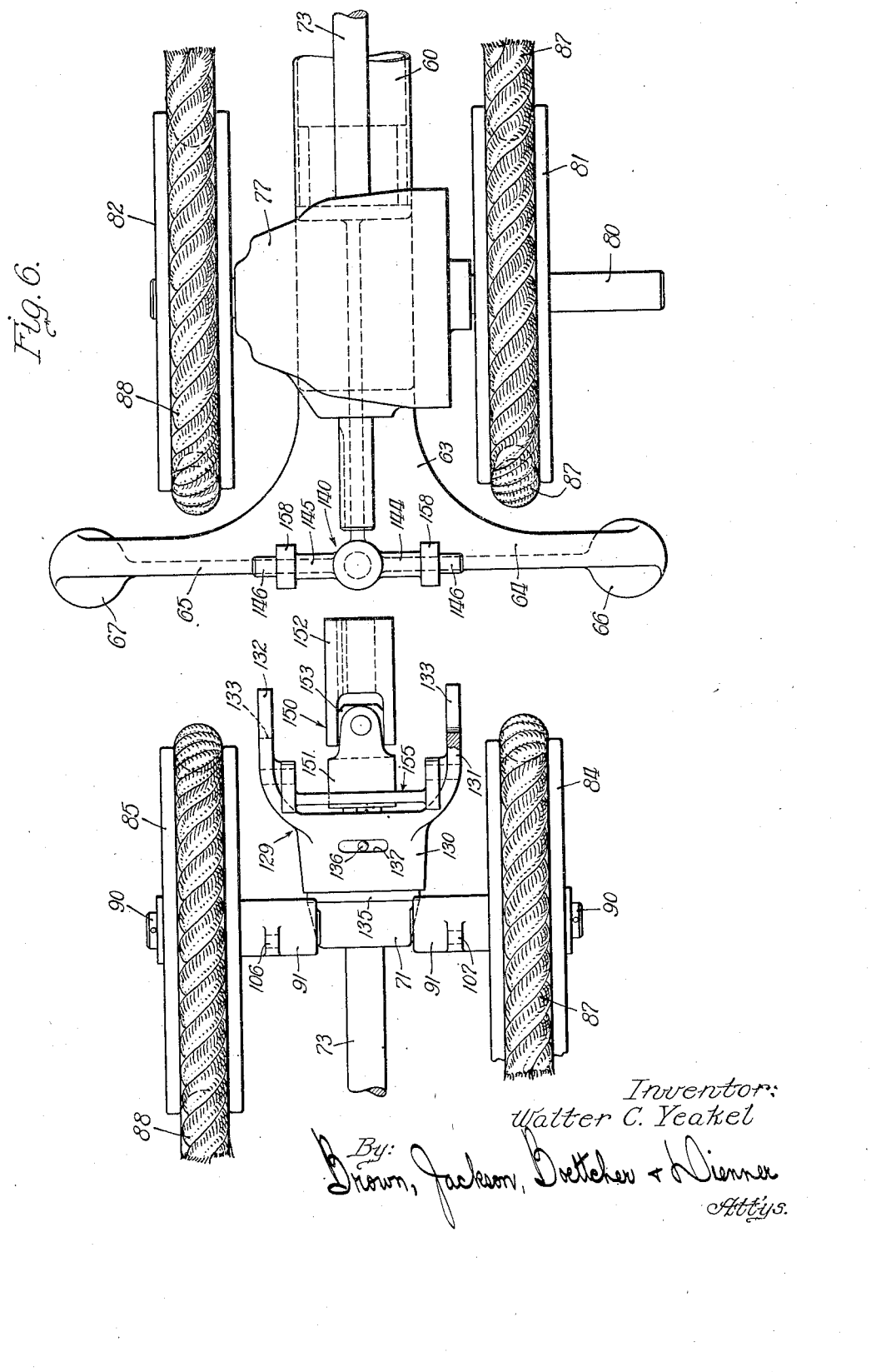

Dec. 14, 1937.　　　　W. C. YEAKEL　　　　2,102,248
CONVEYER
Filed Feb. 25, 1935　　　7 Sheets-Sheet 5
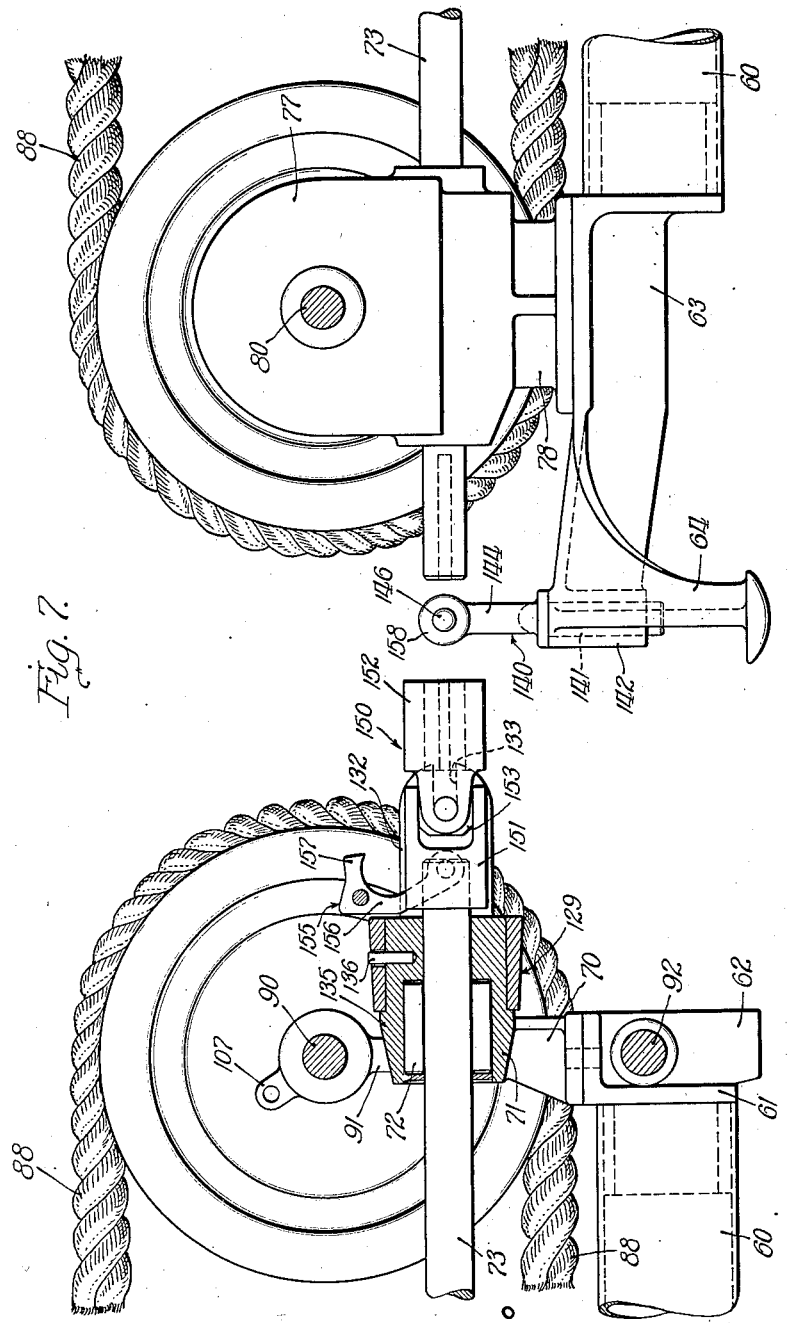

Dec. 14, 1937.  W. C. YEAKEL  2,102,248
CONVEYER
Filed Feb. 25, 1935   7 Sheets-Sheet 6
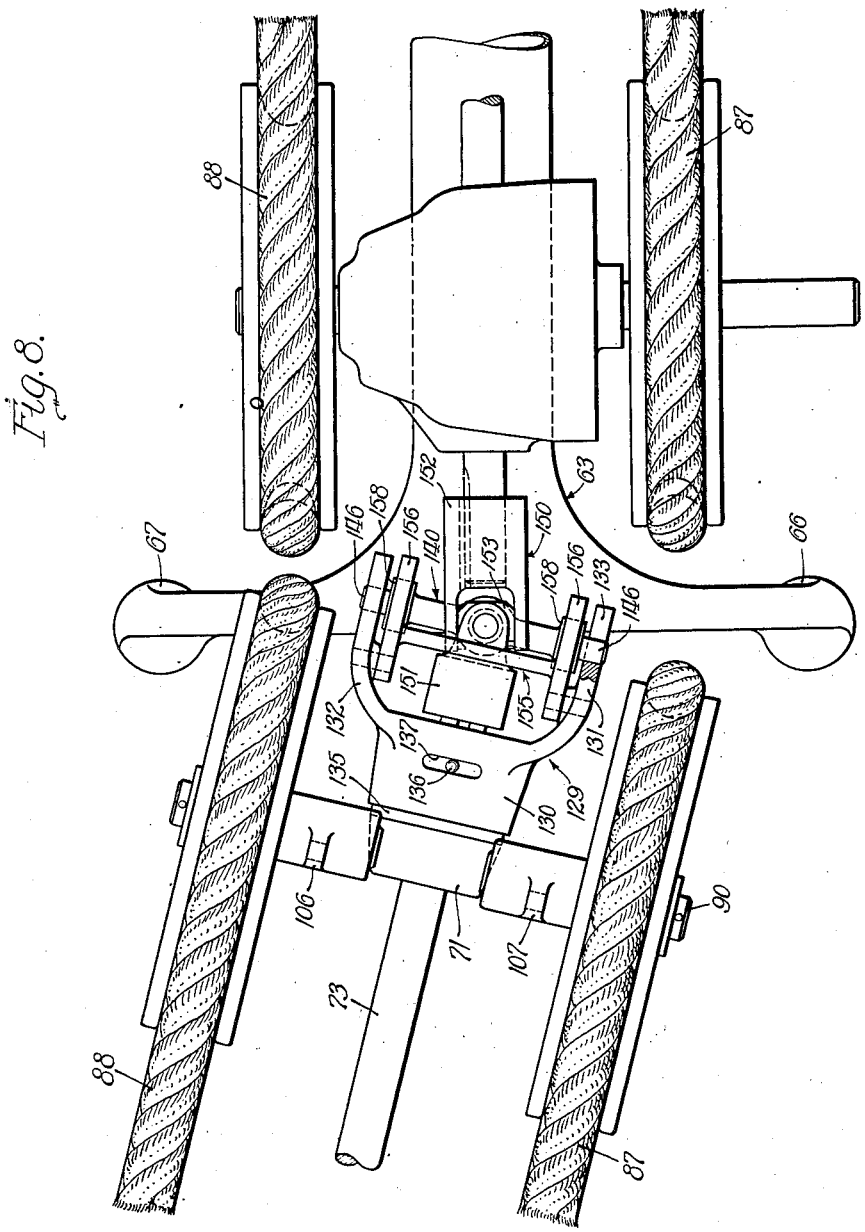
Inventor:
Walter C. Yeakel
By: Brown, Jackson, Boettcher & Dienner
Attys.

Dec. 14, 1937.  W. C. YEAKEL  2,102,248
CONVEYER
Filed Feb. 25, 1935   7 Sheets-Sheet 7
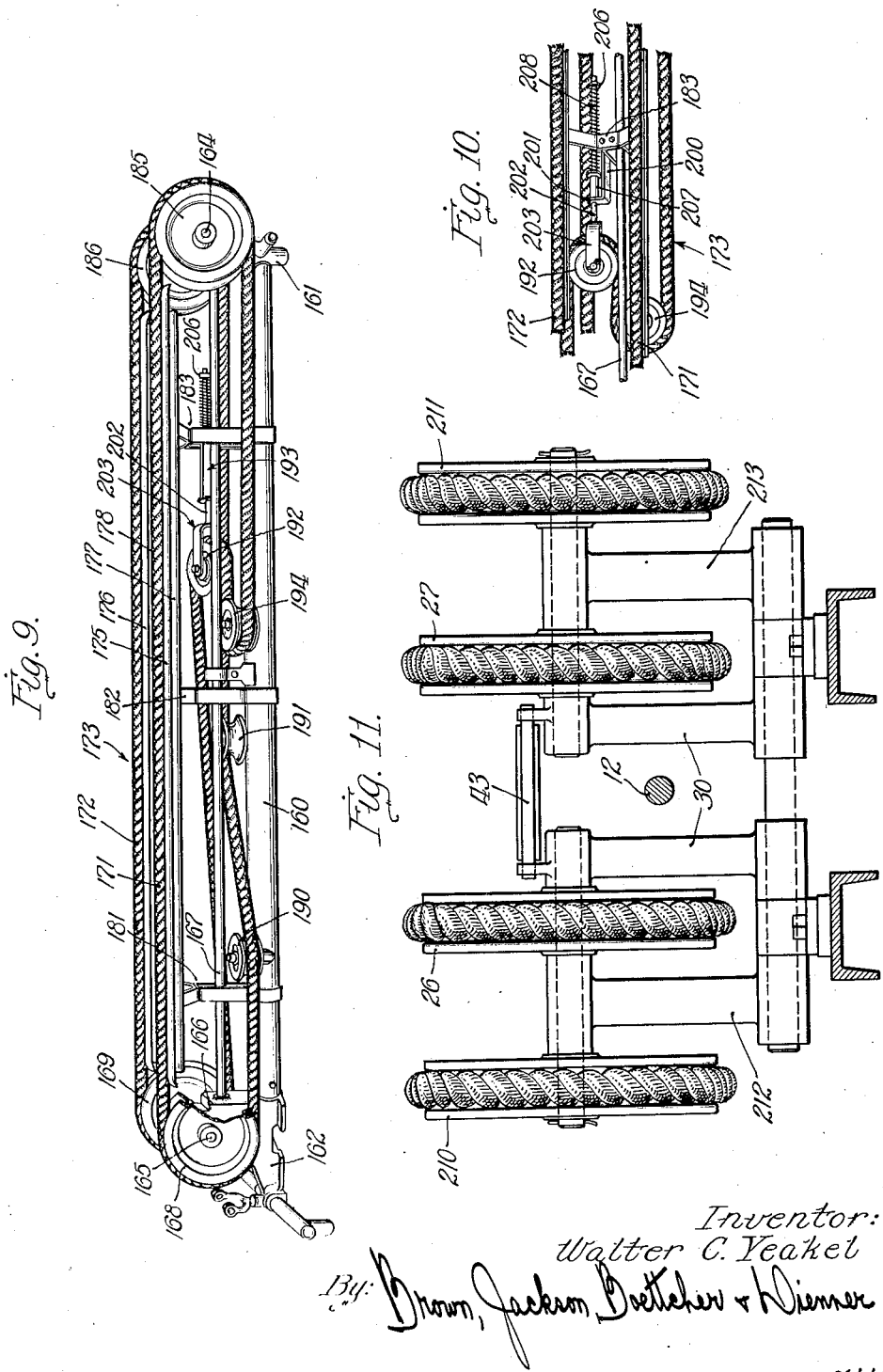
Inventor:
Walter C. Yeakel
By Brown, Jackson, Boettcher & Dienner
Attys.

Patented Dec. 14, 1937

2,102,248

UNITED STATES PATENT OFFICE 2,102,248

CONVEYER

Walter C. Yeakel, Battle Creek, Mich., assignor, by mesne assignments, to Clark Equipment Company, Buchanan, Mich., a corporation of Michigan Application February 25, 1935, Serial No. 7,954

26 Claims. (Cl. 198—88)

The present invention relates to conveyers and similar devices for transporting boxes, bags, barrels and other objects from place to place, and is particularly concerned with conveyers of the general type which operate with endless strands, chains, belts or the like.

The principal object of the present invention is to provide a simple and inexpensive conveyer for conveying all forms of packaged material in which the conveying elements are of ordinary hemp rope in the form of belts running over grooved pulleys.

Another object of the present invention is to provide such a conveyer which is made up of units that can be readily joined together in a manner which permits them to be assembled at an angle with respect to each other as well as in a straight line relation, the permissive angularity including both vertical and horizontal angles.

An additional object of the present invention is the provision of improved connecting means between the various conveyer sections to accommodate the aforesaid angularity, both vertical and horizontal, while effectively and efficiently transmitting the actuating power from the driving unit to the supporting grooved pulleys.

A further object of the present invention is the provision of a conveyer made up of units, one being a power unit and the others being driven units actuated through suitable connections with the power unit, and a further object of the present invention in this connection is the provision of drive means for each of the driven units which includes a longitudinally disposed drive shaft arranged to drive the two or more conveying strands of rope or similar material.

Another important object of the present invention is the provision of a conveyer unit utilizing two or more strands of rope, with the upper run of each supported so as to carry loads and actuated by suitable driving connections so as to be always in tension on the top side.

Still further, another object of the present invention is the provision of a conveyer unit employing two load carrying strands acting in tension and movable in the same direction for transporting objects, said two strands being formed of one continuous rope or belt.

These and other objects of the present invention will be apparent to those skilled in the art after a consideration of the following detailed description of the preferred embodiments, taken in conjunction with the accompanying drawings.

Referring now to the drawings:

Figure 2 is a side view of a power unit and one of the driven units in straight line position;

Figure 3 is an enlarged section taken along the line 3—3 of Figure 2;

Figure 6 is a top view illustrating the driving connection from the shaft of one driven unit to the shaft of another driven unit, and the manner in which the two units are to be connected together with one supported on the other for movement with respect thereto about axes which coincide with the axes of the universal joint which connects the driving shafts of the units;

Figure 7 is a side view of the construction shown in Figure 6, certain of the parts being shown in section, both Figures 6 and 7 illustrating the parts in disassembled relation;

Figure 8 is a view similar to Figure 6 but showing the parts in their assembled position, with one unit arranged at a horizontal angle with respect to the other;

Figure 9 is a perspective view showing a modified form of the present invention in which one continuous rope is arranged to provide two load carrying strands and in which the pulley supports are fixed and suitable tension means for the rope is carried by the frame between the ends thereof;

Figure 10 is a view showing the tensioning means for the construction shown in Figure 9; and Figure 11 is a view showing a modified form of the present invention embodying four load supporting strands.

Figure 1:
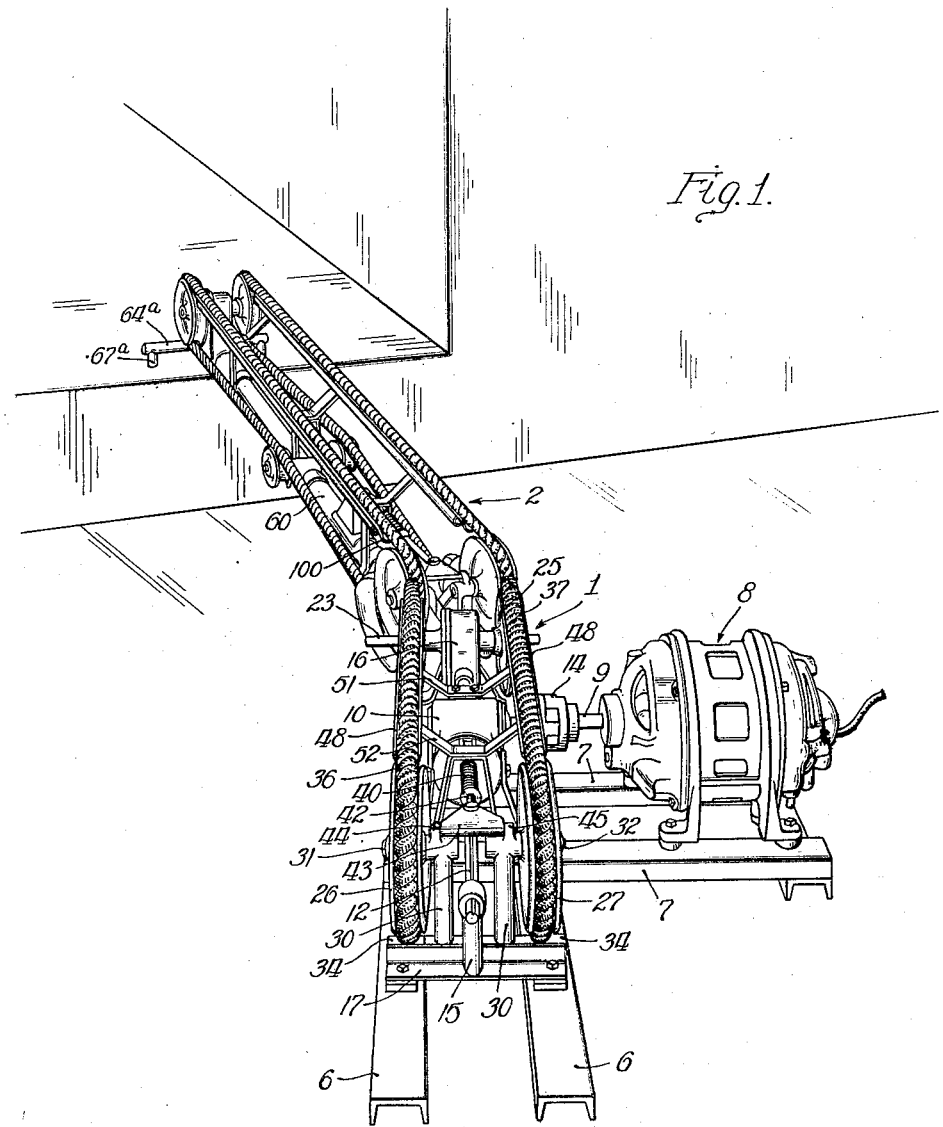
Figure 1 is a perspective view of a power unit and one of the driven units disposed at an angle to the power unit, both in the vertical plane and in the horizontal plane.

Referring now more particularly to Figures 1 to 3, the reference numeral 1 indicates, in its entirety, a conveyer power unit, and the reference numeral 2 indicates one of a series of driven conveyer units suitably connected, as will be explained later, with the unit 1 to receive power therefrom. While in Figure 1 I have shown only one of such driven units, it is to be understood that any suitable or desirable number may be operatively associated with a power unit. The power unit 1 itself comprises a suitable base or frame 5 including a pair of laterally spaced channels 6 and a pair of laterally arranged channels 7, each pair being disposed in parallelism, and the lateral channels being suitably secured, as by welding or the like, to the upper sides of the longitudinal channels 6, as best shown in Figure 2. The lateral frame channels 7 support a source of power, such as an electric motor 8 having a drive shaft 9.

A gear case 10 is mounted on the longitudinal channels 6 in between the motor frame channels 7, the casing 10 including gear reduction means operatively connected to drive a longitudinal shaft 12 from the motor shaft 9 at a reduced rate. To this end, the gear reduction means mounted in the casing or housing 10 is preferably worm gearing including a worm secured to a shaft journaled in the upper part of the casing, and connected with the motor shaft 9 through a flexible coupling 14, and a gear fixed to the longitudinal shaft 12. The intermediate portion of the latter is supported by suitable bearings in the casing 10, and at one end the shaft is supported by a bracket 15 at one end of the frame while the other end of the shaft is supported in a second gear reduction housing 16 at the other end of the frame 6, as best shown in Figure 1.

The bracket 15 is carried upon an angle 17 suitably secured as by bolts or rivets to the channels 6, and as best shown in Figure 2, the housing 16 includes a base section 20 suitably secured as by bolts or rivets to the channels 6 at the ends thereof opposite the transverse angle 17. A pulley shaft 23 is journaled in laterally arranged bearings carried by the casing 16, and a pair of laterally spaced grooved pulleys 24 and 25 are securely fixed to the shaft 23, and at the other end of the power unit frame channels 6, laterally spaced grooved pulleys 26 and 27 are provided, each mounted for separate swinging movement upon a rockable bracket 30, the brackets 30 having stub shafts 31 and 32, respectively, upon which the grooved pulleys 26 and 27 are rotatably mounted. As best shown in Figure 2, each of the brackets 30 is supported for rocking movement at its lower end on a shaft or pivot support 34 carried by and secured to the longitudinal channels 6, just forward of the vertical flange of the transverse angle member 17.

A pair of rope belts 36 and 37 is carried by the pulleys 24 and 26, and 25 and 27, respectively, the aforesaid pulleys being disposed in parallel planes, as best shown in Figure 1. The proper tension is maintained in the belts 36 and 37 by means of a spring 40 which encircles and is mounted on a member that is pivotally anchored to a bracket 41 carried by the gear reduction housing 10 and which also engages and acts against a second member 42 slidable with respect to said first member and connected to an equalizer 43 at its other end. The equalizer 43 has lateral extensions pivotally connected to ears or lugs 44 and 45 which are formed integral with or carried by the upper ends, respectively, of the brackets or rockable supports 30. This tension equalizer for the belts 36 and 37 of the power unit 1 is substantially the same as the tension equalizing means for the driven units shown in Figures 4 and 5, and which will be described later. The spring 40 acts to rock the supports for the pulleys 26 and 27 in a clockwise direction as viewed in Figure 2, this being for the purpose of maintaining the proper tension in the conveying belts 36 and 37, and by virtue of this construction, the same tension is imposed on each of the ropes 36 and 37 by means of a single resilient member.

The upper runs of the endless belts 36 and 37 constitue the load carrying portions, and as best shown in Figures 1 and 2, an angle iron 48 is arranged at each side of the unit 1 in substantially horizontal position directly underneath the load carrying strands, and the angles 48 are suitably supported in the position shown in Figure 1 by suitable brackets 51 and 52, each consisting of two U-shaped members secured together, back to back, with the leg portions of one of them secured to the frame channels 6 and the arm or side portions of the other serving to receive and support the angles 48. From Figure 2 it is also to be noted that the U-shaped support 52 embraces one end of the spring 40 of the rope tensioning means. The angles 48 are not secured directly to the upper side portions of the brackets 51 and 52, but each is supported on and reenforced by a tubular member 54 in any suitable manner, as by welding or the like, preferably the same construction, shown in Figure 3, as for the driven units which will be described below. These parts take practically the entire weight of the material or objects being transported, thereby relieving the ropes 36 and 37 of all tension stresses, except, of course, those incident to the driving of the rope belts of that unit.

Each of the driven units 2 embodies substantially the same construction as that described above for the power unit 1. In certain respects, however, the construction of a driven conveyer unit differs from that described above, and one of the driven units will now be described. The frame of the driven unit consists of a longitudinal central pipe or tubular member 60 connected at its rear end with a casting 61 having a centrally disposed foot 62, as best shown in Figure 7 in which the forward end of an adjacent driven section is shown. The opposite or forward end of the supporting tubular member 60 of each driven unit carries a casting 63 provided with laterally directed sections 64 and 65 terminating in supporting feet 66 and 67, as best indicated in Figures 6 and 7. The rear casting 61 of each driven unit is formed with an upstanding portion 70 terminating in a sleeve section 71, and the sleeve section 71 is provided with suitable bearing means 72 rotatably supporting a drive shaft 73. The other end of the shaft 73 is journaled in the lower part of a gear case 77 which includes a supporting portion 78 secured to a shelf portion formed on the casting 63, as best shown in Figure 7. The gear case 77 serves to support a transverse pulley shaft 80 upon which pulleys 81 and 82 are securely fixed to rotate therewith. The pulley shaft 80 is driven from the driving shaft 73 by means of a worm secured to the driving shaft 73 and disposed within the housing 77 and a worm wheel carried by the shaft 80 within the housing and meshing with the aforesaid worm. It is to be understood, of course, that any other form of drive or gear reduction means between the shaft 73 and the pulley shaft 80 may be provided.

Figure 4:
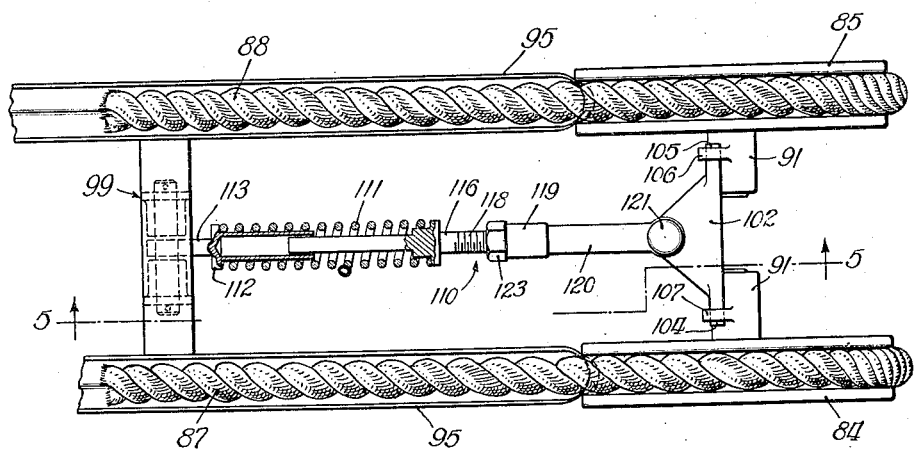
Figure 4 is a fragmentary top plan view of the rear end of one of the driven units, showing the means for maintaining the load carrying strands at the proper tension.
Figure 5:
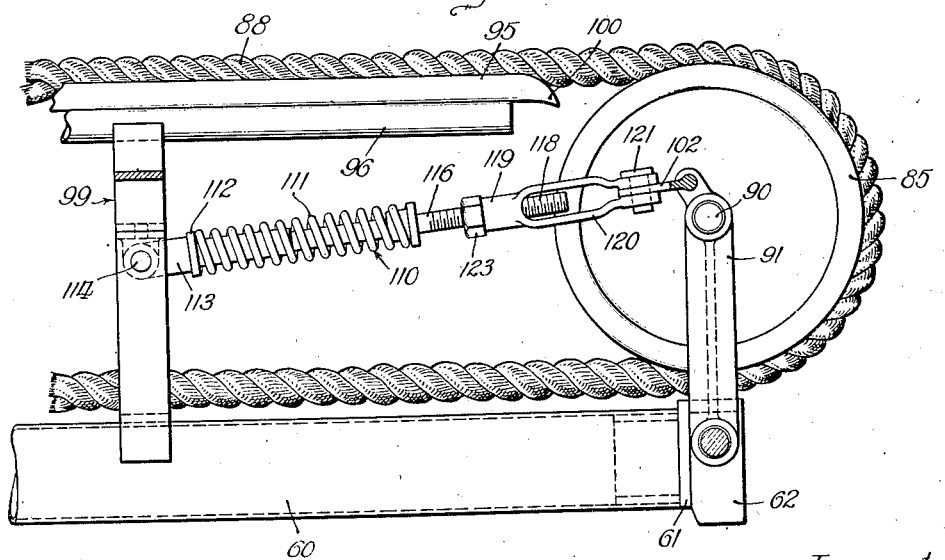
Figure 5 is a section taken along the line 5—5 of Figure 4.

A pair of pulleys 81 and 82, such as those just described, are disposed on the shaft 80 at the forward end of each of the driven units, and, at the rear end of each of the driven units, pulleys 84 and 85 are provided, as best shown in Figures 4 and 5. These pulleys are grooved, as are the pulleys 81 and 82, to receive conveying belts 87 and 88 of rope or the like, and, like the idler pulleys 26 and 27 of the power unit 1, the pulleys 84 and 85 of each driven unit are mounted for rocking movement about transverse axes and associated with suitable tension retaining means for maintaining the proper tension in the conveying belts or strands. Each of the pulleys 84 and 85 is mounted on a stub shaft 90 suitably secured in the upper end of a rockable standard 91, the lower end of which is pivoted upon a shaft 92 carried in any suitable manner by the rear casting member 61.

The lower runs of the belts 87 and 88 are supported on a pair of idler pulleys 93 carried on a shaft carried by a bracket 94 (Figure 3) which is also provided with bearing means supporting the intermediate portion of the shaft 73. The conveying or upper runs of the two belts 87 and 88 of each driven unit are suitably supported by means which is substantially the same as that provided in the power unit 1 for the same purpose, and includes an angle iron 95 carried by and secured to, as by welding or the like, a supporting tubular member 96. An angle member 95 and a tubular supporting member 96 are provided for each of the belts, and both of such supporting means are carried, in the driven units, by supporting bracket means 97, 98 and 99 (Figure 2), these brackets being identical, for all practical purposes, with the brackets 51 and 52 described above in connection with the power unit 1. The angles 95 constitute guides for supporting the rope belts, and the guides 95 at each end thereof are flared, as indicated by the reference numeral 100, to prevent wearing the ropes at these points.

The tensioning means for maintaining the belts 87 and 88 taut comprises an equalizer member 102 similar to the equalizer 43 described above, the member 102 including lateral arm portions 104 and 105 which are respectively received by ears or lugs 106 and 107 carried by the two rockable brackets or supports 91 for the pulleys 84 and 85. Tension is applied to the two standards 91 through the equalizer member 102 by suitable spring means indicated in its entirety by the reference numeral 110, and consisting of a compression spring 111 bearing, at one end, against the shoulder 112 carried on a member 113 pivotally anchored, as at 114, to the bracket 99, the other end of the spring acting against an adjustable member 116 having portions disposed in slidable telescopic relation with respect to the member 113. The adjustable member 116 includes a threaded portion 118 receiving the sleeve end 119 of a clevis 120 that is pivotally connected by a pin 121 with the equalizer 102. An adjusting nut 123 can be adjusted on the end 118 of the member 116 to apply greater or less tension on the ropes 87 and 88.

So far as I have described above, there has been provided a power unit and one or more driven units, each having a longitudinal shaft by which the grooved pulleys at one end of the unit are rotated to cause the upper runs of the rope belts to be driven in the same direction while supported on the guides therefor. One feature of the present invention lies in the manner in which the driven units can be connected to each other or to the shaft of the power unit. As described above, it will be remembered that the longitudinal shaft of the power unit as well as the shafts of the driven units extend from one end to the other of the supporting frame for the unit, so that by connecting the adjacent ends of the shafts together, the entire assembly of units can be driven by operating the power unit. The means by which these connections are established while accommodating angular displacement of one unit with respect to the other, both in the vertical plane and in the horizontal plane, will now be described.

Referring now to Figures 6, 7 and 8, at the rear end of each of the units there is provided a yoke member indicated in its entirety by the reference numeral 129, each including a sleeve portion 130 and two laterally disposed bifurcated arms 131 and 132, each being slotted as at 133 in Figures 6 and 8. The yoke 129 is mounted for limited rocking movement about an axis, coinciding with the axis of the driving shaft 73, the sleeve section 71 being provided with a shoulder 135 up against which the yoke 129 is disposed, as best shown in Figure 7, and the section 71 carries a pin 136 which is received in a slot 137 formed in the sleeve section of the yoke 129 and serves the purpose not only of keeping the yoke section in place on the casting section 71, but, in addition, serves to limit the permissive rocking movement of the yoke 129. This end of the driven unit is adapted to be operatively connected with either the front end of the power unit 1 or the front end of an intervening driven unit as indicated in Figures 7 and 8. For the purpose of establishing the proper connection, the casting member 63, in the case of an intervening driven unit (Figure 7) or the front end of the power unit 1, is provided with a vertical yoke 140 having a spindle 141 suitably journaled for rocking movement about a vertical axis in a sleeve portion 142 of the casting 63. The yoke 140 extends upwardly in the form of a pair of laterally spaced arms 144 and 145, each of which carries a laterally outwardly extending pin or stud 146 disposed to receive the slots 133 of the yoke 129 on the rear section of the unit to be attached and supported thereby, as indicated in Figure 8. The actual connection between the rear end of the shaft 73 of one unit and the front end of the shaft 73 of the adjacent unit is accomplished by a universal joint 150 of more or less conventional construction, embodying two similar members 151 and 152 keyed or splined onto the associated driving shaft and having arms pivotally connected to a block 153 for movement about axes lying at right angles to each other in a vertical transverse plane. When the units are assembled, the axes of the universal joint 150 coincide with the axes established by the pivot studs 146 and the spindle 141. In order to hold the assembled sections together, a lock 155 is provided which consists of arms 156 pivoted on pins carried by the yoke arms 131 and 132, and hooks 157 arranged, when the lock is swung in a clockwise direction, as viewed in Figure 7, down over shoulders 158 on the yoke arms 144 and 145 to hold the conveyer sections or units together, the arms 131 and 132 of the yoke 129 bearing on the pins 146 of the yoke 140 serving to transmit the weight of the rear end of one section to the front end of the adjacent section, cooperating with the center foot 62 in this respect. The slot 137, permitting the yoke 129 to rock laterally relative to the unit, compensates for uneven floors or careless assembly. By virtue of this construction each unit can take any angular position, within practical limits, both vertically and horizontally, relative to the preceding section or unit. This provides a very flexible conveyer system in which practically any kind of package, sacked material, barrels, boxes and cartons can be handled.

While I have described above the use of rope for the conveying strands or belts, and such does form the preferred material, it is to be understood that my invention is not to be limited to the use of this material. Rope has a number of advantages, but other flexible elements, such as chains, flat belts and the like could be used where found desirable. Also, instead of having castings of the form shown at 62 in Figures 6 and 7, the lateral and foot sections, 64 to 67, may be replaced by a transverse pipe 64a (Figures 1 and 2) provided with foot portions 67a, if desired.

Figure 2 shows a somewhat different form of tensioning means as compared with the construction shown in Figures 4 and 5. In Figure 2 the tensioning means comprises the same unit 110 as is described above and illustrated in Figures 4 and 5, but instead of being anchored as at 114 in Figure 5 to one of the guide supporting standards, in Figure 2 the anchoring member 113a is pivotally connected to a separate bracket 159 suitably welded or otherwise permanently secured to the supporting tubular member 60. In both cases, however, the action of the spring means in keeping the rope strands taut is substantially the same.

Figures 9 and 10 show a somewhat modified form of the present invention, distinguishing from the form previously described in that the two load conveying strands are supplied by the use of a single continuous rope and the use of direction-changing pulleys. Also, the supporting grooved pulleys at the ends of the unit are fixed and are not arranged to rock because the required tensioning means takes another form, being preferably associated with certain of the aforesaid direction-changing or idler pulleys.

Referring now more particularly to Figures 9 and 10, the reference numeral 160 indicates a tubular supporting member similar, for all practical purposes, to the tubular supporting member 60 described above, and including end castings or members 161 and 162 similar to those described above, but in Figure 9 both the castings include a suitable fixed support for the pulley shafts 164 and 165. The casting 162 carries or includes a gear case 166 which contains suitable gear means by which the longitudinal drive shaft 167, journaled for rotation on said castings, is driven. The drive pulleys 168 and 169, being mounted on the shaft 165, are thus driven by power to drive the load carrying strands 171 and 172. In the form of the invention shown in Figure 9, however, the load carrying strands 171 and 172 form a part of the same rope, indicated in its entirety by the reference numeral 173. The load carrying strands are held in position by angle guides 175 and 176, welded to guide supports 177 and 178 carried by brackets 181, 182 and 183, as in the previously described modification. The long continuous rope 173 is trained over a pair of pulleys 185 and 186 carried by the pulley shaft 164, the pulleys 168 and 185 being disposed in alignment, that is, they occupy positions in the same plane, and the same is true of the pulleys 169 and 186 at the other side of the unit.

In order to be able to use one long continuous rope to provide the two load carrying strands 171 and 172, a plurality of idler pulleys are mounted on the tubular supporting member 160. The idler pulleys 190 and 191 are, in effect, disposed on opposite sides of the tubular supporting member 160 and serve to direct the rope, coming off the pulley 168, to a position so it will run around the rear pulley 186 at the other side of the unit. Similarly, rope coming from the drive pulley 169 passes around the pulley 192 of a tensioning means, indicated in its entirety by the reference numeral 193, and over a third idler pulley 194 carried on the same side of the tubular member 160 as the idler 190. The idler 190 is mounted in a position to feed or direct rope around the supporting pulley 185.

The tensioning means 193 is best shown in Figure 10 and comprises a bracket 200 rigidly secured to one of the lower legs of the supporting standard 183. The bracket 200 includes an end 201 disposed at right angles to the main body of the bracket and apertured to slidably receive the shank 202 of a supporting member 203 for the pulley 192 carried thereby. The shank 202 extends toward the idler supporting pulleys 185 and 186 and at its end carrier a cap 206, and between which and a shouldered member 207 carried by the bracket 200 a compression spring 208 is disposed for the purpose of constantly urging the pulley 192 toward the right as viewed in Figures 9 and 10. The drive shaft 167 of the single rope unit just described is driven in the same manner and is adapted to be optionally connected together with other units in the same manner as described above, so that a repetition of these connections is not necessary.

According to the principles of the present invention, more than two load supporting strands may be provided where desirable or necessary. For example, as shown in Figure 11, a unit similar to that shown in Figures 1 and 2 may be provided with pulley shafts of somewhat greater length, and additional pulleys 210 and 211 and additional rocking brackets 212 and 213 may be mounted alongside the pulleys 26 and 27. A similar construction can be employed at the other end of the unit, whether a power unit or a driven unit, thereby providing for four separate load carrying strands. Similarly, the modification shown in Figures 9 and 10 may likewise be provided with additional pulleys and the single continuous rope trained around them in such manner that, although only a single rope is used, the desired four separate load carrying strands are provided.

While I have described above the preferred structure in which the principles of the present invention have been embodied, it is to be understood that my invention is not to be limited to the details shown and described, but that, in fact, widely different means may be employed in the practice of the broader aspects of my invention.

What I claim, therefore, and desire to secure by Letters Patent is:

1. A conveyer comprising a pair of spaced bars serving as a supporting base, a bracket secured to one end of said bars and acting to maintain the latter in spaced apart relation, a transverse shaft carried by said bracket, a pair of pulleys mounted on said shaft, bracket means supported at the other end of said bars and serving to maintain them in spaced apart relation, said bracket means including independently swingable sections, a pulley carried by each section, a pair of endless belts, one carried by each of said last mentioned pulleys and the associated one of said first mentioned pulleys, means associated with said swingable bracket sections for maintaining said endless belts under substantially the same tension, and means supported by said base for driving said belts.

2. A conveyer comprising means serving as a base, a stationary bracket secured to one end of the base, a pair of spaced pulleys carried by said bracket, bracket means carried at the other end of said base and including swingably mounted sections, a pair of spaced pulleys, one carried by each of said swingable sections, a pair of endless belts supported in parallel relation by said pulleys, spring means reacting against said swingable bracket sections for maintaining tension in said pair of belts, and means for driving said endless belts.

3. A conveyer comprising a pair of spaced bars serving as a supporting base, brackets secured to said bars adjacent the ends thereof and acting to maintain the bars in spaced apart relation, transverse shaft means carried by each bracket, a pair of pulleys mounted on each shaft means, endless belt means having portions supported in parallel relation by said pulleys, a longitudinal shaft carried by said brackets and connected with one of said transverse shaft means for driving said belts, a plurality of intermediate brackets carried by said base between the pulleys at one end and the pulleys at the other end, said brackets terminating upwardly in laterally directed branches, a tubular supporting member carried by said branches at each side of the base, and a supporting member having upwardly diverging faces carried by each of said tubular members and adapted to receive the associated upper run of the belt at that side of the base.

4. A conveyer comprising means serving as a base, a bracket secured to the base at one end thereof, a pair of spaced apart pulleys mounted on said bracket, bracket means carried at the other end of said base and including two laterally spaced swingable bracket sections, a pulley supported by each of said sections, a pair of endless belts supported in parallel spaced apart relation by said pulleys, an equalizer member pivotally connected with said swingable bracket sections, spring means reacting against said equalizer member for maintaining substantially the same tension in each of said endless belts, and means associated with the pulleys at the other end of said base for driving said belts.

5. A conveyer comprising a pair of interconnected sections each having endless belt conveying means, a source of power for driving the conveying means of one section, means at the ends of the other section for movably supporting the associated conveying belt, one of said supporting means being longitudinally adjustable to maintain tension in said belt, and a driving connection extending from said one section to the other of said belt supporting means at the far end of the other section for driving the conveying belt of the latter with the upper run of the belt moving under tension away from said first section.

6. A conveyer comprising a plurality of conveyer sections, adjacent sections being pivotally connected together for relative movement about an axis, a source of power, and articulated means separate from the pivot connection between said sections and including a universal joint disposed in said axis for driving said sections from said source of power.

7. A conveyer comprising a plurality of conveyer sections, conveying means on each of said sections, a longitudinal shaft extending from one end to the other of each of said sections for driving the conveying means of that section, a universal joint connecting the end of one longitudinal shaft with the adjacent end of the next shaft, means for supporting the end of one section on the adjacent end of the next section including a yoke swiveled for movement about one axis and carried by one section, a second yoke carried by the other section and swiveled for movement about an axis disposed at right angles to said first axis, and means pivotally supporting the arms of one yoke on the arms of the other yoke for relative movement about an axis at right angles to both of the aforesaid axes, all of said axes intersecting at a point in the plane of the axes of the universal joint connecting the two associated longitudinal shafts.

8. A conveyer comprising a pair of spaced bars serving as a supporting base, a bracket secured to one end of said bars and acting to maintain the latter in spaced apart relation, a transverse shaft carried by said bracket, a pair of pulleys mounted on said shaft, bracket means supported at the other end of said bars and serving to maintain them in spaced apart relation, said bracket means including independently swingable sections, a pulley carried by each section, a pair of endless belts, one carried by each of said last mentioned pulleys and the associated one of said first mentioned pulleys, and means associated with said swingable bracket sections for maintaining said endless belts under tension.

9. A portable conveyer comprising a tubular member serving as a movable supporting base, brackets secured to and movable with said base adjacent the ends thereof, transverse shaft means carried by each bracket, a pair of pulleys mounted on said shaft means, endless belt means having portions supported in parallel relation by said pulleys, a plurality of intermediate brackets carried by said base between the pulleys at one end and the pulleys at the other end, and a supporting member carried at each side of the base on said intermediate brackets and having upwardly opening supporting surfaces adapted to receive the associated upper run of the belt means at that side of the base so as to relieve the pulleys of the strain of supporting the load on the upper runs of said belt means.

10. A conveyer comprising a plurality of conveyer sections, conveying means on each of said sections, a longitudinal shaft extending from one end to the other of each of said sections for driving the conveying means of that section, a universal joint connecting the end of one longitudinal shaft with the adjacent end of the next shaft, and means connecting said sections together for relative movement about a plurality of axes coinciding generally with the axes of relative movement of said universal joint.

11. A conveyer comprising a plurality of conveyer sections, each of said sections including means serving as a base, bracket means carried at each end thereof, a pair of laterally spaced pulleys mounted for rotation on each of said brackets, belt means including load supporting portions carried in spaced relation on said pulleys, and a longitudinally disposed driving shaft extending from one end to the other of said base and operatively connected with certain of said pulleys for driving said load carrying belt portions, each of said longitudinal shafts being disposed in a position between said pulleys, means pivotally connecting the base portions of said sections together for relative movement about a plurality of axes, and universal joint means connecting the ends of adjacent shafts together, the axes of relative movement defined by said universal joint corresponding to the axes of relative pivotal movement between the associated sections.

12. A conveyer comprising a base including a longitudinally disposed tubular member, a casting mounted at one end thereof and including a central foot portion and a second casting mounted at the opposite end of said tubular member and including laterally directed portions terminating in laterally spaced foot sections, each of said castings including upwardly facing bracket receiving surfaces, brackets mounted thereon at opposite ends of the base and each carrying journal means, a longitudinally disposed shaft mounted in said journal means on said brackets and extending therefrom at opposite ends, a pair of laterally spaced pulleys mounted for rotation on each of said brackets, means operatively connecting one end of said shaft with the pulleys disposed at that end for driving the latter, and load carrying belt means mounted on said pulleys.

13. A conveyer comprising a base including a longitudinally disposed tubular member, a casting mounted at one end thereof and including a central foot portion and a second casting mounted at the opposite end of said tubular member and including laterally directed portions terminating in laterally spaced foot sections, each of said castings including upwardly facing bracket receiving surfaces, brackets mounted thereon at opposite ends of the base and each carrying journal means, a longitudinally disposed shaft mounted in said journal means on said brackets and extending therefrom at opposite ends, a pair of laterally spaced pulleys mounted for rotation on each of said brackets, means operatively connecting one end of said shaft with the pulleys disposed at that end for driving the latter, load carrying belt means mounted on said pulleys, an intermediate bracket carried by said tubular base member between the castings at the ends thereof, and idler pulleys carried on said intermediate bracket for supporting the lower run of said belt means.

14. A portable conveyer comprising means serving as a base, bracket means secured to each end of the base, a pair of spaced pulleys carried by each of said bracket means and disposed laterally outwardly of the base, belt means including load supporting portions supported in parallel relation by said pulleys, a longitudinal drive shaft extending substantially the entire length of said base, an intermediate bracket carried by the latter for supporting said longitudinal shaft, means connecting the latter with one pair of pulleys for driving the same, and a transverse bar disposed at the end of said base adjacent said one pair of pulleys and serving to hold the conveyer in upright position.

15. A conveyer section comprising means serving as a supporting base, a pair of brackets secured to said base, transverse shaft means carried by each bracket, a pair of pulleys mounted on each shaft means, endless belt means supported with portions in parallel relation by said pulleys, a plurality of intermediate brackets carried by said base between the pulleys at one end and the pulleys at the other end, said brackets terminating upwardly in laterally directed branches, a supporting member carried by said branches at each side of the base and having upwardly supporting surfaces adapted to receive the associated upper run of the belt at that side of the base, and means for driving said belt means.

16. A conveyer section comprising a supporting base, brackets secured thereto adjacent the ends thereof, transverse shaft means carried by each bracket, a pair of pulleys mounted on each shaft means, endless belt means supported with portions in parallel relation by said pulleys, a longitudinal shaft carried by said brackets and connected with one of said transverse shaft means for driving said belt means, a plurality of intermediate brackets carried by said base between the pulleys at one end and the pulleys at the other end, said brackets terminating upwardly in laterally directed branches, and a supporting member carried by said branches at each side of the base and having upper supporting surfaces adapted to receive the associated upper run of the belt means at that side of the base.

17. A conveyer section comprising a supporting base, brackets secured to said base adjacent the ends thereof, transverse shaft means carried by each bracket, a pair of pulleys mounted on each shaft means, a pair of endless belts supported in parallel relation by said pulleys, a plurality of intermediate inverted U-shaped brackets carried by said base between the pulleys at one end and the pulleys at the other end, said brackets carrying upwardly and laterally directed branches, longitudinally disposed supporting members having upwardly directed faces carried by said branches and adapted to receive the upper runs of the belt, and means including a longitudinal shaft disposed on said base between the legs of said intermediate brackets and connected with one of said transverse shaft means for driving said belts.

18. A conveyer comprising a pair of interconnected sections pivotally connected together for relative movement about an axis and each having endless belt conveying means, a source of power arranged to drive the conveying means of one section, means at the ends of the other section for movably supporting the associated conveying belts, and a driving connection extending from said one section to the belt supporting means at the far end of the other section and including articulated means separate from the pivot connection between said sections and having a universal joint disposed in said axis for driving the conveying belts of said other section with the upper run of the belts moving under tension away from said one section.

19. A conveyer comprising a tubular member serving as a supporting base, brackets secured to said base adjacent the ends thereof, transverse shaft means carried by each bracket and extending laterally outwardly of said tubular member, a pair of pulleys mounted on each shaft means, endless belt means having load carrying portions supported in parallel relation by said pulleys, a plurality of intermediate brackets fixed to said tubular member and terminating upwardly in laterally divergent branches, means carried by the latter for receiving the load supporting portions of said belt means, means fixed to said tubular member for supporting the lower portions of said belt means, and means for driving said belt means.

20. A frame for a conveyer comprising a supporting base, pulley supporting brackets secured to said base adjacent the ends thereof, a plurality of intermediate brackets carried by said base between said first brackets and terminating upwardly in laterally directed branches, and a belt supporting member carried by said branches.

21. A frame for a conveyer comprising a supporting base, pulley supporting brackets secured to said base adjacent the ends thereof, a plurality of intermediate brackets carried by said base between said first brackets and terminating upwardly in laterally directed branches, a tubular supporting member carried by said branches at each side of the base, and a belt supporting member having upwardly diverging faces carried by each of said tubular members.

22. A conveyer comprising a base including a longitudinally disposed member, a casting mounted at one end thereof and including a central foot portion and a second casting mounted at the opposite end of said member and including laterally directed portions terminating in laterally spaced foot sections, a longitudinally disposed shaft supported for rotation on said castings and extending therefrom at opposite ends, a pair of laterally spaced pulleys mounted for rotation on each of said castings, means operatively connecting one end of said shaft with the pulleys disposed at that end for driving the latter, and load carrying belt means mounted on said pulleys.

23. A conveyer comprising a base including a longitudinally disposed member, a casting mounted at one end thereof and including a central foot portion and a second casting mounted at the opposite end of said member and including laterally directed portions terminating in laterally spaced foot sections, a longitudinally disposed shaft supported for rotation on said castings and extending therefrom at opposite ends, a pair of laterally spaced pulleys mounted for rotation on each of said castings, means operatively connecting one end of said shaft with the pulleys disposed at that end for driving the latter, load carrying belt means mounted on said pulleys, an intermediate bracket carried by said base member between the castings at the ends thereof, and idler pulleys carried on said base for supporting the lower run of said belt means.

24. A portable conveyer comprising a longitudinal member serving as a base, bracket means secured to each end of the base, a pair of spaced pulleys carried by each of said brackets and disposed laterally outwardly thereof, belt means including load supporting portions supported in parallel relation by said pulleys, a central foot section at one end of said longitudinal member, and a transverse section disposed at the other end of said longitudinal member and serving to hold the conveyer in upright position.

25. A portable conveyer comprising a member serving as a base, bracket means secured to each end of the base, a pair of spaced pulleys carried by each of said bracket means and disposed laterally outwardly of the base, belt means including load supporting portions supported in parallel relation by said pulleys, a longitudinal drive shaft extending substantially the entire length of said member, an intermediate bracket carried by the latter for supporting said longitudinal shaft, means connecting the latter with one pair of pulleys for driving the same, and bracket means carried by said base member for receiving the load supporting portions of said belt means.

26. A frame for a conveyer comprising a supporting base, pulley supporting brackets secured to said base adjacent the ends thereof, a plurality of intermediate brackets carried by said base between said first brackets and terminating upwardly in laterally directed branches, supporting means carried by said branches at each side of said base and including longitudinally extending members forming upwardly directed faces for supporting the upper run of an endless belt intermediate said pulley supporting brackets.

WALTER C. YEAKEL.